US008707985B2

(12) United States Patent
Goss

(10) Patent No.: US 8,707,985 B2
(45) Date of Patent: Apr. 29, 2014

(54) QUICK STOP ENCASEMENT FOR MALFUNCTIONING FIRE SPRINKLER HEAD

(76) Inventor: Tom Goss, Scottsdale, AZ (US)

( * ) Notice: Subject to any disclaimer, the term of this patent is extended or adjusted under 35 U.S.C. 154(b) by 179 days.

(21) Appl. No.: 13/442,260

(22) Filed: Apr. 9, 2012

(65) Prior Publication Data

US 2012/0255629 A1 Oct. 11, 2012

Related U.S. Application Data

(60) Provisional application No. 61/473,103, filed on Apr. 7, 2011.

(51) Int. Cl.
*A62C 35/68* (2006.01)
*F16K 27/12* (2006.01)

(52) U.S. Cl.
USPC .......................................... 137/377; 137/312

(58) Field of Classification Search
CPC .......... F16L 55/18; F16K 27/12; E03B 7/095; A62C 35/68; B67D 7/3209; B67D 1/16; B65D 90/24; B65D 11/02
USPC .................................... 137/312, 377; 169/37
See application file for complete search history.

(56) References Cited

U.S. PATENT DOCUMENTS

| | | | | |
|---|---|---|---|---|
| 2,699,960 | A * | 1/1955 | Callery | 285/13 |
| 2,954,797 | A * | 10/1960 | Dryer | 137/312 |
| 3,191,685 | A | 6/1965 | Warne | |
| 5,344,193 | A | 9/1994 | Rio | |
| 5,348,044 | A * | 9/1994 | Eugene et al. | 137/312 |
| 5,752,540 | A | 5/1998 | Hansel, Sr. | |
| 6,244,290 | B1 * | 6/2001 | Reicin et al. | 137/312 |
| 6,588,070 | B2 | 7/2003 | Tran | |
| 6,845,784 | B2 | 1/2005 | Pascznk | |
| 7,478,646 | B2 * | 1/2009 | Borrenpohl et al. | 137/377 |
| 8,240,167 | B2 * | 8/2012 | Ingram | 62/259.4 |
| 2008/0197133 | A1 | 8/2008 | McKay et al. | |

* cited by examiner

*Primary Examiner* — Kevin Lee
(74) *Attorney, Agent, or Firm* — Benjamin D. Tietgen; Quarles & Brady LLP

(57) ABSTRACT

A removable casing for a fire sprinkler head encases the sprinkler head to stop unwanted water spray. The casing has hinged shells that latch closed to form a watertight interior space. One or both of the shells have gaskets that contact the opposite shell to seal off the interior space. The hinges and latches may be adjustable to make the casing easier to fit over the sprinkler head and to fasten tightly. Each shell may have one or more necks configured to fit tightly around a pipe when the casing is closed. A drain having a valve may be disposed through one or both of the shells to prevent initial pressure buildup and to allow the removal of accumulated water from inside the casing. The casing fills with water until the flow out of the sprinkler head stops, allowing the rest of the fire sprinkler system to remain active.

16 Claims, 14 Drawing Sheets

QUICK STOP ENCASEMENT FOR MALFUNCTIONING FIRE SPRINKLER HEAD

CROSS-REFERENCE TO RELATED APPLICATIONS

This application is a non-provisional and claims the benefit of U.S. patent application Ser. No. 61/473,103 filed Apr. 7, 2011 and incorporated herein by reference.

FIELD OF INVENTION

This invention relates to fire sprinkler control devices. This invention relates particularly to an apparatus for encasing a damaged or malfunctioning fire sprinkler head to stop the flow of water out of the head while allowing the remainder of the sprinkler system to stay active.

BACKGROUND

A structural fire sprinkler system is composed of fire sprinkler heads that spray water into the structure interior, a series of supply pipes that deliver water under pressure from a water source to the sprinkler heads, and various types of controls for determining response parameters and starting or stopping the flow of water. Typical sprinkler heads detect a fire in the vicinity with a heat-sensitive plug that fails at a certain temperature. In a "wet" system, the water is retained under pressure in the supply pipes at the mouth of the sprinkler heads, such that the plug is the only impediment to the water being released at high velocity from the sprinkler head. Thus, upon failure of the plug, the sprinkler head is activated and immediately begins to saturate the surrounding area.

Unfortunately, typical plugs are susceptible to damage or dislocation due to unintended contact, such as bumping during a construction project, or other unwanted mechanical failure. The immediate emission of water after a plug failure is good for suppressing fires, but causes significant unnecessary water damage when a sprinkler head is simply malfunctioning. The typical response to a malfunctioning sprinkler head is to disable the entire sprinkler system, typically by turning off the system's water. However, there is usually only one valve for turning off the water, which may be far away from the malfunctioning head, hard to locate, or inaccessible without the presence of a landlord or other authorized personnel. Additionally, turning off the water leaves the building vulnerable to any actual fire that breaks out while the water is off. A device that encloses the spraying sprinkler head to limit or eliminate saturation of the surrounding area is needed. It would be advantageous for the device to be quickly and easily installed over the sprinkler head to limit water damage while allowing the fire sprinkler system to remain active. It would also be advantageous for the device to require no technical knowledge to use, so that any person who may be in the vicinity of the sprinkler head may use the device with little or no training.

The problem has been addressed with several devices that fit over the sprinkler head. One problem with known devices is that they must be held in place against the ceiling over the sprinkler head. Some devices must be physically held by a person, who is typically on a ladder, while others are held in tension using a pole that extends down to the floor under the sprinkler. The pole may not be usable if the sprinkler is installed in a high ceiling, or with no ceiling, or if furniture or other articles inhibit the path to the floor. A device that does not need to be propped against the ceiling around the sprinkler head is needed.

Another problem with known devices is that they attempt to control the flow of water by diverting it rather than stopping it. Typically, the device has an outlet that is attached to a hose or other apparatus to direct the water flowing out of the sprinkler head to a common collection area, to the sewer, or elsewhere. This is a potential waste of water and could result in water damage if there is a leak or hose damage or if the device is moved while the water is still flowing. A device that stops the flow rather than diverting it is needed.

Therefore, it is an object of this invention to provide a device to encase a spraying fire sprinkler head and prevent water damage from the spray. It is a further object that the device attach to the sprinkler head or supply pipe so it does not have to be propped against the ceiling or held in tension by the floor of the structure. A further object is to provide a device that stops the flow of water from the sprinkler head rather than diverting it. Another object of the invention is to provide a device that will stop the flow of water from a damaged sprinkler head without affecting the rest of the fire sprinkler system. Another object of the invention is to provide an easy-to-use device to encase a spraying fire sprinkler head.

SUMMARY OF THE INVENTION

A removable casing for a fire sprinkler head is used to prevent water damage by enclosing the sprinkler head when the sprinkler head is activated. The removable casing has first and second complementary shells that are hinged together and close to form a watertight, and preferably also airtight, interior space. Each shell may have a gasket that contacts the gasket of the other shell to form a seal when the casing is closed. One or more latches draw the shells tightly together in the closed position. The hinges and latches may be adjustable to make the casing easier to fit over the sprinkler head and to fasten tightly. Each shell may have one or more necks configured to fit tightly around a pipe when the casing is closed. A drain having a valve may be disposed through one or both of the shells to allow the removal of accumulated water from inside the casing. The drain valve may be open when the casing is placed over a malfunctioning sprinkler head in order to reduce air pressure as the seal is formed, then the valve may be closed to stop the flow of water. Once the seal is formed, the casing fills with water until water pressure equilibrium is reached, stopping the flow of water out of the malfunctioning sprinkler head.

DETAILED DESCRIPTION OF THE INVENTION

Figure 1:
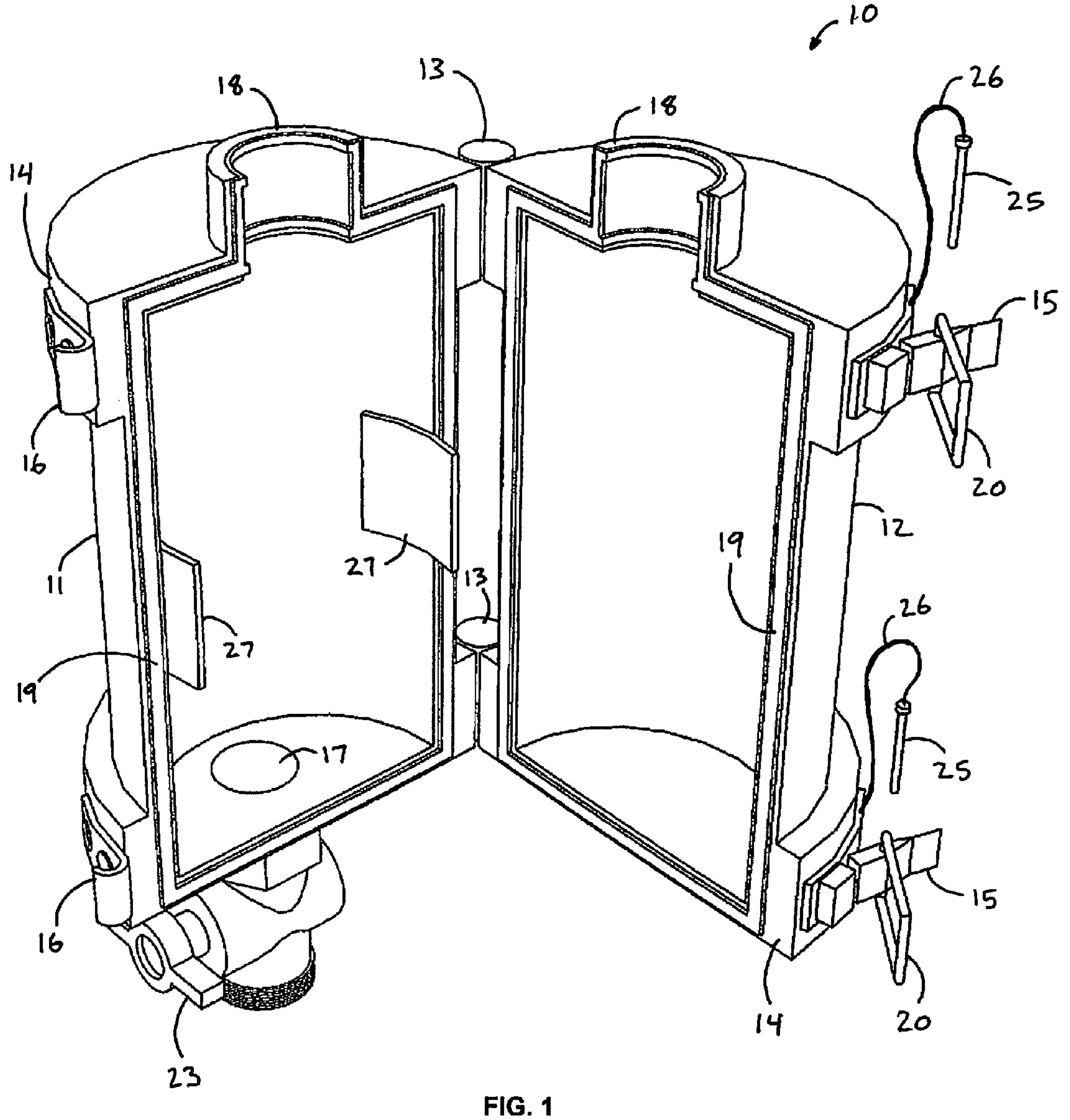
FIG. 1 is a top front perspective view of a first embodiment of the invention.
Figure 2:
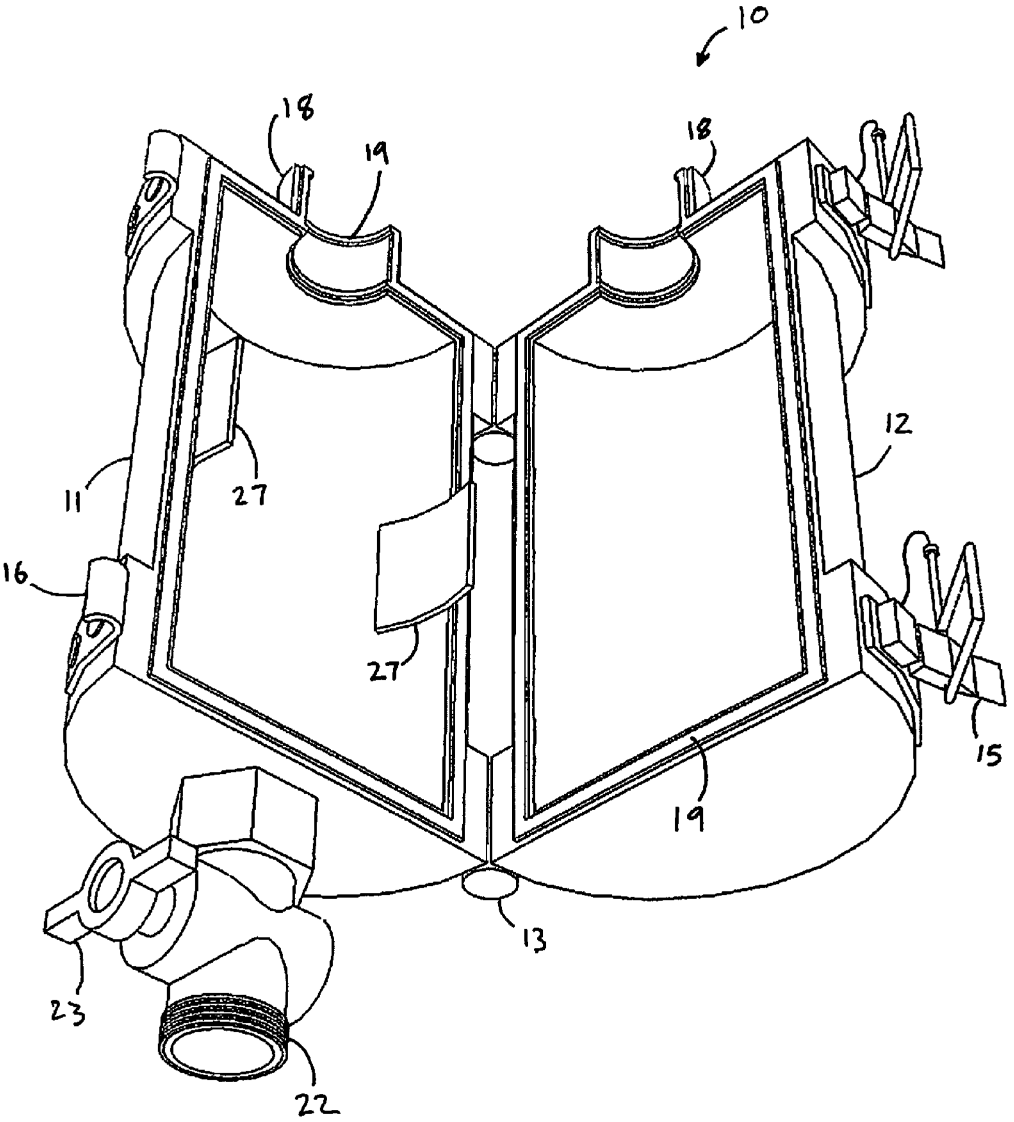
FIG. 2 is a bottom front perspective view of the embodiment of FIG. 1.

Referring to FIGS. 1-8, there is illustrated a first embodiment of the present sprinkler head casing designated generally as 10 which is used to encase a spraying fire sprinkler head 30 and prevent water from saturating and damaging the surrounding area. The casing 10 is a latching, hinged clamshell that closes around the sprinkler head 30 and is held in place by friction fit around one or more of the components of a structural fire sprinkler system as described below. The casing 10 comprises a first shell 11 and a second shell 12. The shells 11, 12 may be made of the same or a different material, which may be polyvinyl chloride or another polymer, aluminum, stainless steel, or another material that is rigid and non-permeable and does not degrade in water. The thickness of the shell 11, 12 walls is sufficient to withstand the water and air pressure inside the casing 10 during use. Typically, fire sprinkler systems operate under pressure of about 35-90 psi, so the shells 11, 12 are preferably configured to withstand at least that amount of pressure. Preferably the casing 10 is configured to withstand the maximum water pressure contained within the desired fire sprinkler system, but may be rated at higher or lower pressures if desired. As illustrated, the shells 11, 12 may have bands 14 of thicker material at proximal end, distal end, or both ends to provide a mounting surface for latching mechanisms as described below.

The general shape of the casing 10 is defined by the shape of the shells 11, 12. The exterior shape of the casing 10 is preferably substantially a cylinder formed by shells 11, 12 that are half-cylinders. In the first embodiment, the shells 11, 12 are substantially identical except that the first shell 11 has a drain 17 disposed through the distal end of the first shell 11. The shells 11, 12 close to define an interior space in which the sprinkler head 30 is encased. See FIGS. 3 and 4. The interior space should therefore be at least the size of the sprinkler head 30 and fittings to be encased. An interior space of at least about 3 inches in diameter is suitable. Preferably, however, the interior space is larger than the sprinkler head 30 and serves as a water tank, retaining the water that flows from the sprinkler head 30 until the water is emptied from the casing 10. Each shell may have a proximal neck portion 18 formed into the proximal end that cooperates with the proximal neck portion 18 of the other shell to form a neck 40 when the casing 10 is closed. See FIG. 4. The neck portions 18 may have a significant height as illustrated in order to stabilize the casing 10 against the pipe, but alternatively the neck portions 18 may have no or negligible height. The neck 40 has a diameter that fits tightly around a pipe in the sprinkler system, as described below. One or more guides 27 may be disposed on the inner surface of one of the shells 11, 12 to align the shells 11, 12 with each other when the casing 10 is being closed, ensuring that the gaskets 19 make the desired seal as described below. The guides 27 may be attached to the shell 11, 12 with adhesive or heat bonding, or may be formed integrally with the shell 11, 12.

Each shell 11, 12 may have one or more gaskets 19 attached to the surfaces of the shell that would otherwise contact the opposite shell when the casing 10 is closed. The gaskets 19 may be any flexible, impermeable material, such as rubber, elastic, or a flexible polymer. The preferred gasket 19 material is ethylene propylene diene monomer (M-class) rubber. When the casing 10 is closed, at least one gasket 19 of the first shell 11 contacts at least one gasket 19 of the second shell 12. When the casing 10 is then latched, the gaskets 19 of opposing shells 11, 12 are drawn tightly together to form a waterproof seal. Thus, in the preferred embodiment, the gasket 19 of the first shell 11 is substantially complementary to the gasket 19 of the second shell 12. It is contemplated that a single gasket 19 on one of the shells 11, 12 may be sufficient to complete the seal against the opposing shell, which would not have a gasket 19. Similarly, the gaskets 19 may include one or more neck gaskets disposed in the proximal neck portions 18 of each shell 11, 12 to contact the pipe that the neck 40 encircles and form a watertight seal around it. Together, the gaskets 19 form a watertight seal that encases the sprinkler head 30. Alternatively, the gaskets 19 may be formed by o-rings that fit into a groove formed into the respective surfaces to which the o-rings are attached.

The shells 11, 12 may be attached together with one or more hinging mechanisms, such as hinges 13, but alternatively may be attached with another mechanism that allows the shells 11, 12 to close together as described below. For example, the shells 11, 12 may be integrally connected, such as through molding, by a thin portion of material that is substantially flexible to allow the shells to close together. In one embodiment, the hinges 13 are attached to the first shell 11 and second shell 12 at the rear of the casing 10 as illustrated in FIGS. 1-4. A hinge 13 may be any known hinge suitable for hinging the shells 11, 12 together in a clamshell fashion, such as a barrel, pivot, flag, or dovetail hinge. In a particular embodiment, shown in FIGS. 5-8, a hinge comprises a front hinge portion 13*a* attached to the front shell 11 and a rear hinge portion 13*b* attached to the rear shell 12, the hinge portions 13*a*, 13*b* being removably attached to each other with an adjustable hinging mechanism such as the hinging mechanism illustrated in FIGS. 5-8 and described below. Each hinging mechanism may be attached to or integral with the shells 11, 12 at the outer surface of each shell. In one embodiment, the hinging mechanisms are attached to a metal brace 50 that attaches to and extends laterally around the outer surface of the shell. The metal brace 50 may be adhered or non-adhesively attached to the shell. The metal brace 50 structurally supports the shell and provides a mounting surface for the hinging mechanism.

The hinging mechanism illustrated in FIGS. 5-8 comprises a wingnut 60 removably attached to a bolt 62 that passes through an anchor 61. The anchor 61 attaches to one of the hinge portions 13*a*, 13*b*, preferably the rear hinge portion 13*b*, and may be positioned so that the anchor 61 may pivot at or near its proximal end around an axis of rotation substantially parallel to the axis of the casing 10. The anchor 61 may be substantially hollow or may have a channel defined from the proximal to distal end, allowing the bolt 62 to pass through it. The bolt 62 has a threaded portion 63 at its distal end and a head 64 at its proximal end. The head 64 permanently or removably attaches to the hinge portion opposite that to which the anchor 61 is attached, and thus preferably attaches to the front hinge portion 13*a*. The threaded portion 63 passes through the anchor 61 and is received by the wingnut 60, which is complementarily threaded. The shells 11, 12 are thus attached together, and may be disposed apart from each other or drawn tightly together by loosening or tightening the wingnut 60 on the bolt 62. The rotation of the anchor 61 and loosening of the wingnut 60 allow the casing 10 to be opened and spread apart, facilitating the positioning of the casing 10 in use. The wingnut 60 further allows a greater degree of tightening to be applied than with a non-adjustable hinge 13, providing more compression of the gaskets 19 together to improve the casing's 10 seal. The wingnut 60 can be removed to separate the shells 11, 12 from each other.

The casing 10 is latched using one or more latching mechanisms attached across the seam 41 between the shells 11, 12 at the front of the casing 10. Any known latching mechanism capable of drawing the shells together to compress the gaskets 19 and form a seal, which is also capable of withstanding the pressure accumulated inside the casing 10, may be used. The latching mechanism is preferably attached to the band 14 using rivets 21 or another non-adhesive attachment mechanism. Alternatively, the latching mechanism may be adhered to the band 14 or another surface of the shells 11, 12, or the latching mechanism may be integral with the shells 11, 12, such as by casting or molding. Preferably, two latching mechanisms are used, being positioned near opposite ends of the casing 10 to ensure a tight seal. In one embodiment, the latching mechanism comprises a draw latch 15 and a hook 16 that receives a metal loop 20 of the draw latch 15. Such a latch draws the gaskets 19 together to compress them, and is also inexpensive and easy to use. The latch 15 is preferably secured closed using a pin 25 that passes through holes in the latch 15 to lock the latch 15 closed while the pin 25 is in place. The pin 25 may be connected to the shell with a cable 26.

In an alternative embodiment, the latching mechanism comprises a bolt having a head that fits into the hook 16, and a nut threadedly attached to the bolt to tighten the latching mechanism and draw the shells 11, 12 together. As shown in FIGS. 5-8, the latching mechanism may comprise substantially the same components as the hinging mechanism, namely an anchor 61, bolt 62, and wingnut 60. The anchor 61 is attached to a bracket 65 permanently or removably attached to a shell 11, 12 opposite the hook 16. The hook 16 may have a channel 66 for receiving the body of the bolt 62 such that the head 64 then fits into the hook 16 to complete the latch when the wingnut 60 is tightened down. See FIG. 8. Each latching mechanism may be attached to or integral with one of the metal braces 50 attached to the outer surface of the shells 11, 12 as described above. Preferably, one latching mechanism and one hinge are attached to each metal brace 50.

A valved nozzle 22 may be attached to the distal end of the first shell 11 in fluid communication with the drain 17 in order to start and stop the flow of water from the casing 10. The nozzle 22 is preferably threaded onto a threaded portion (not shown) of the drain 17. The preferred nozzle 22 is therefore replaceable. Alternatively, the nozzle 22 may be adhesively attached to or integrally molded with the first shell 11. The nozzle 22 may be any nozzle having a valve that is watertight and airtight when closed. The valve preferably has a finger-operated lever 23 that is easily manipulated by the user. The distal end of the nozzle 22 may be threaded to receive a hose for carrying the water away from the casing 10.

Figure 3:
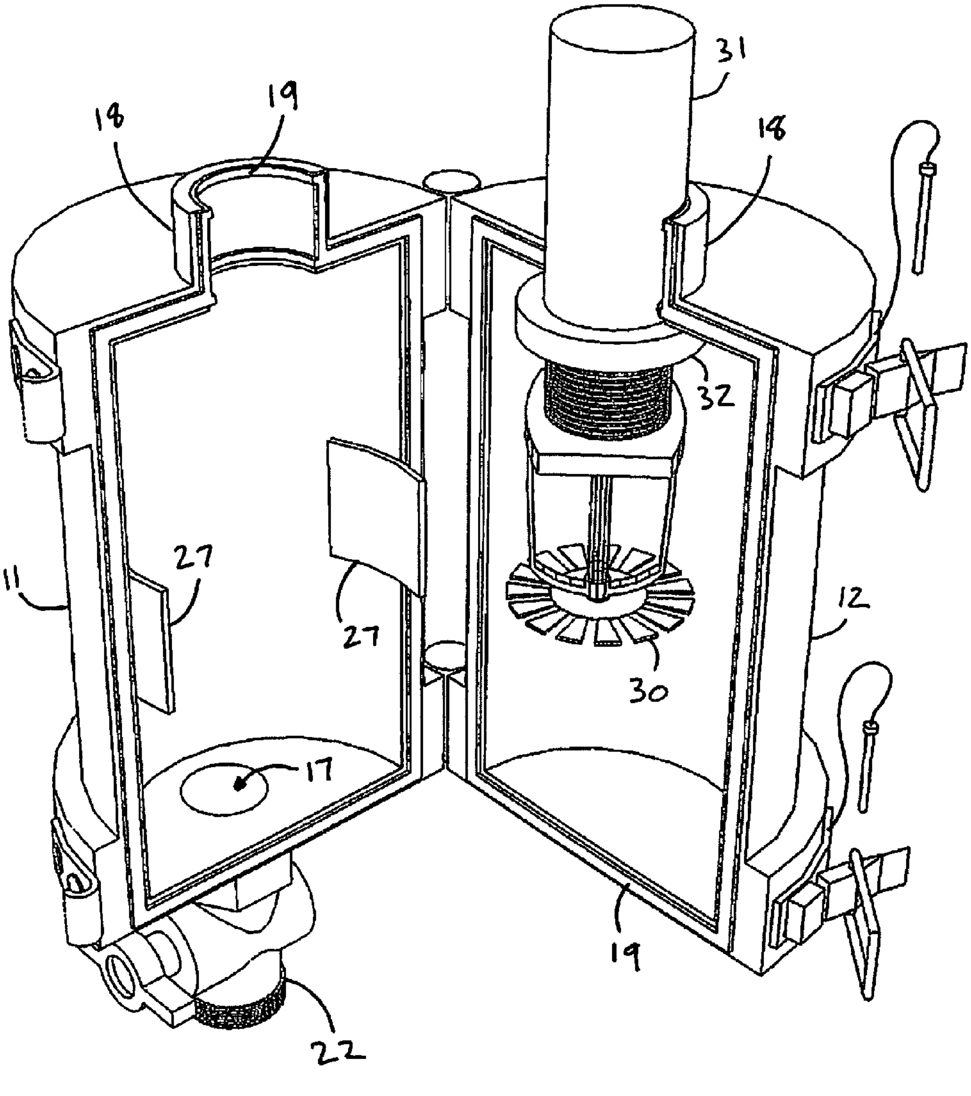
FIG. 3 is a top front perspective view of the embodiment of FIG. 1 placed around a flanged sprinkler head.
Figure 4:
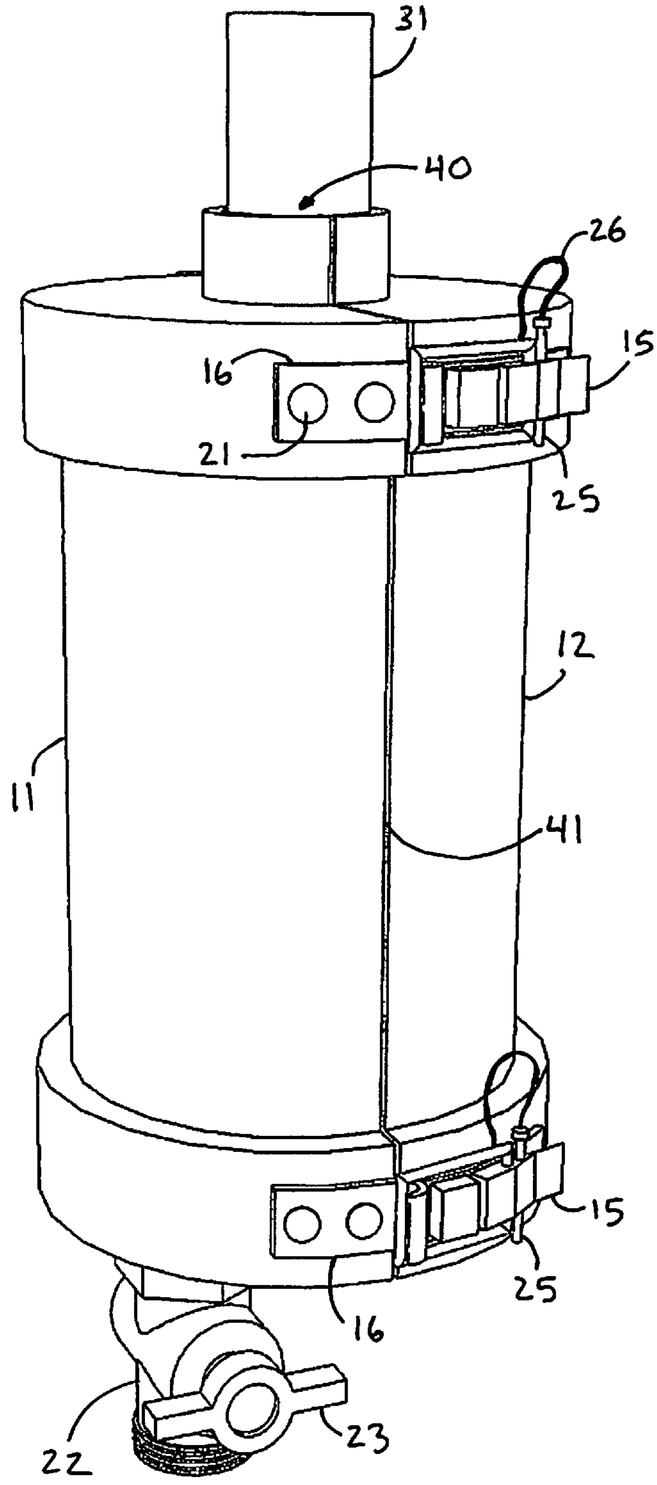
FIG. 4 is a top front perspective view of the embodiment of FIG. 3 closed and latched around the flanged sprinkler head.
Figure 5:
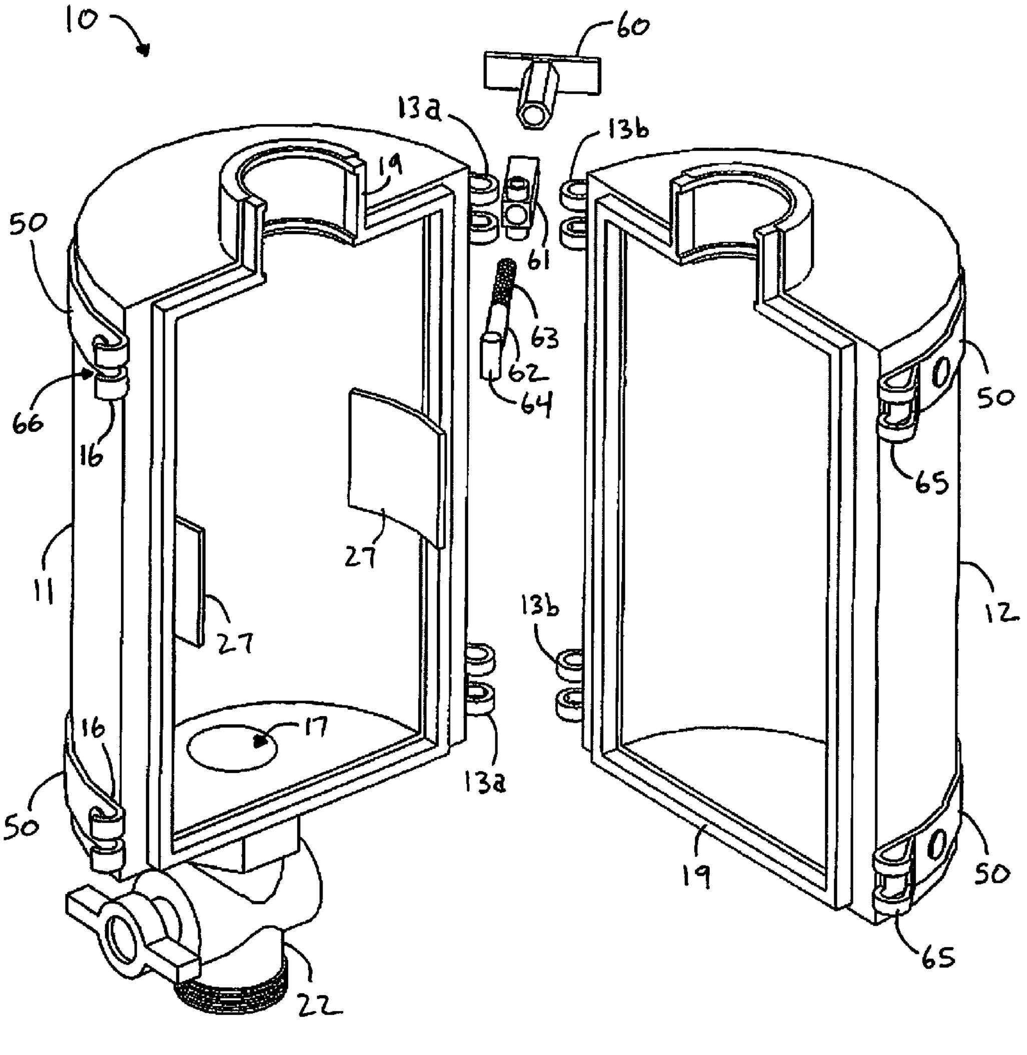
FIG. 5 is a top front perspective view of the first embodiment of the invention with alternate hinges and latches, showing an exploded view of the hinging and latching mechanism.
Figure 6:
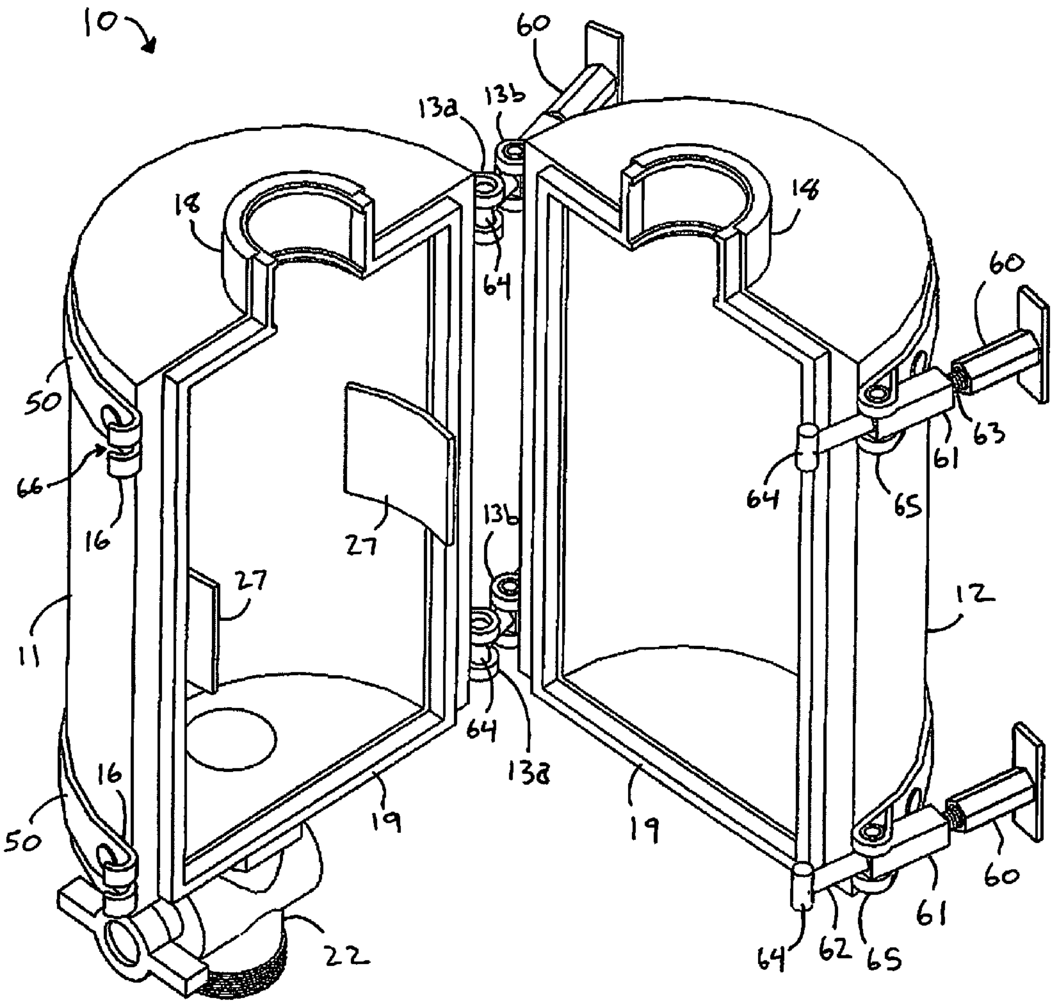
FIG. 6 is a top front perspective view of the embodiment of FIG. 5 showing the shells hinged together with the hinging mechanism.
Figure 7:
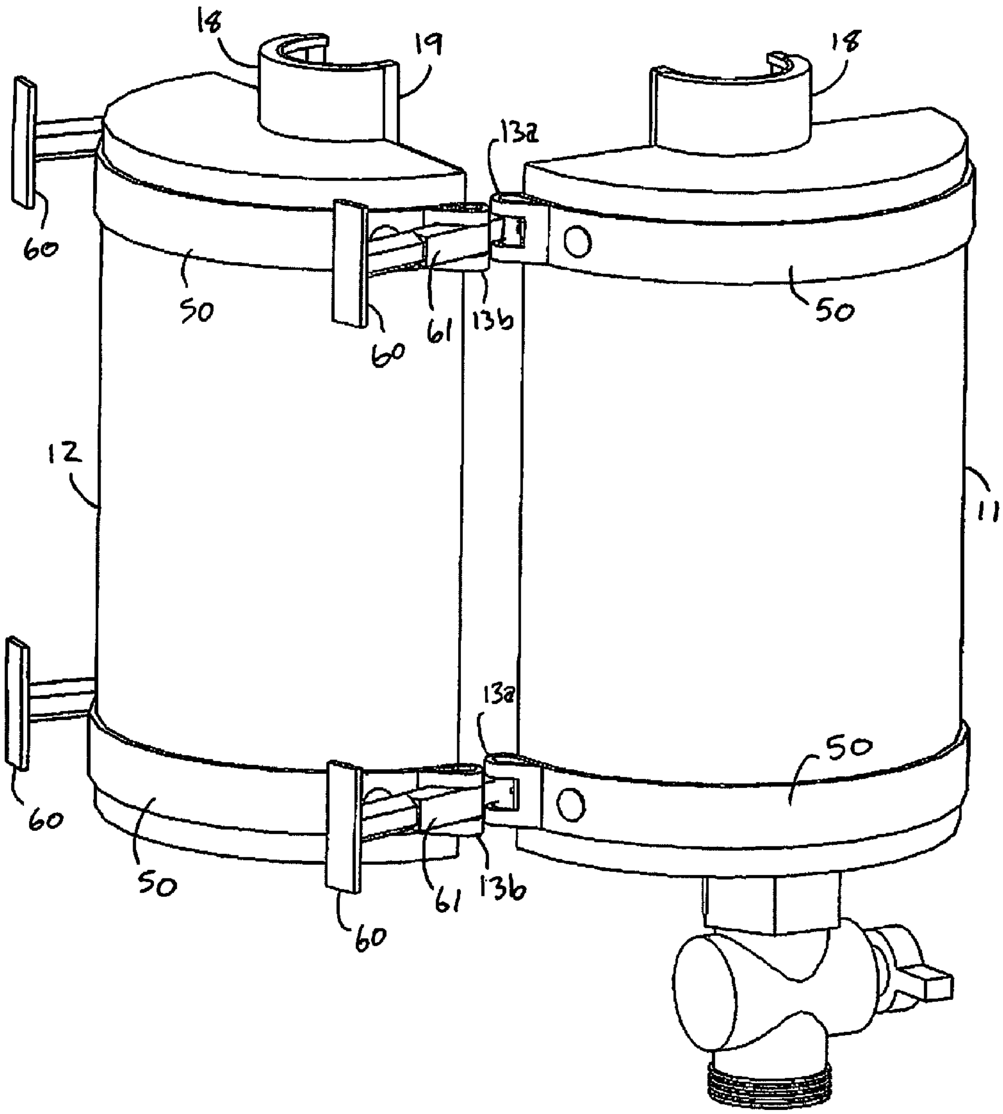
FIG. 7 is a top rear perspective view of the embodiment of FIG. 5 showing the shells hinged together with the hinging mechanism.
Figure 8:
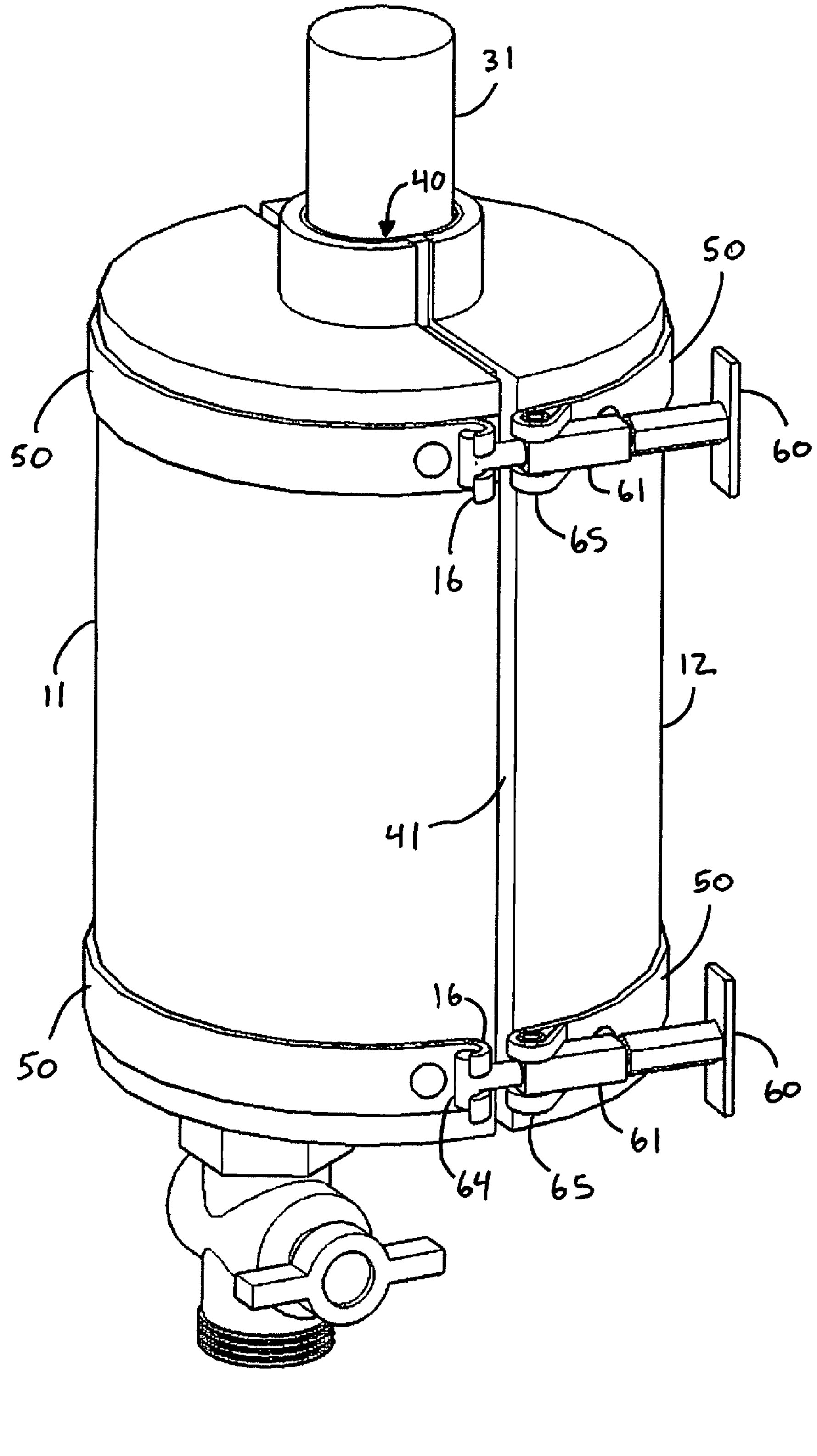
FIG. 8 is a top front perspective view of the embodiment of FIG. 5 closed and latched around the flanged sprinkler head.
Figure 9:
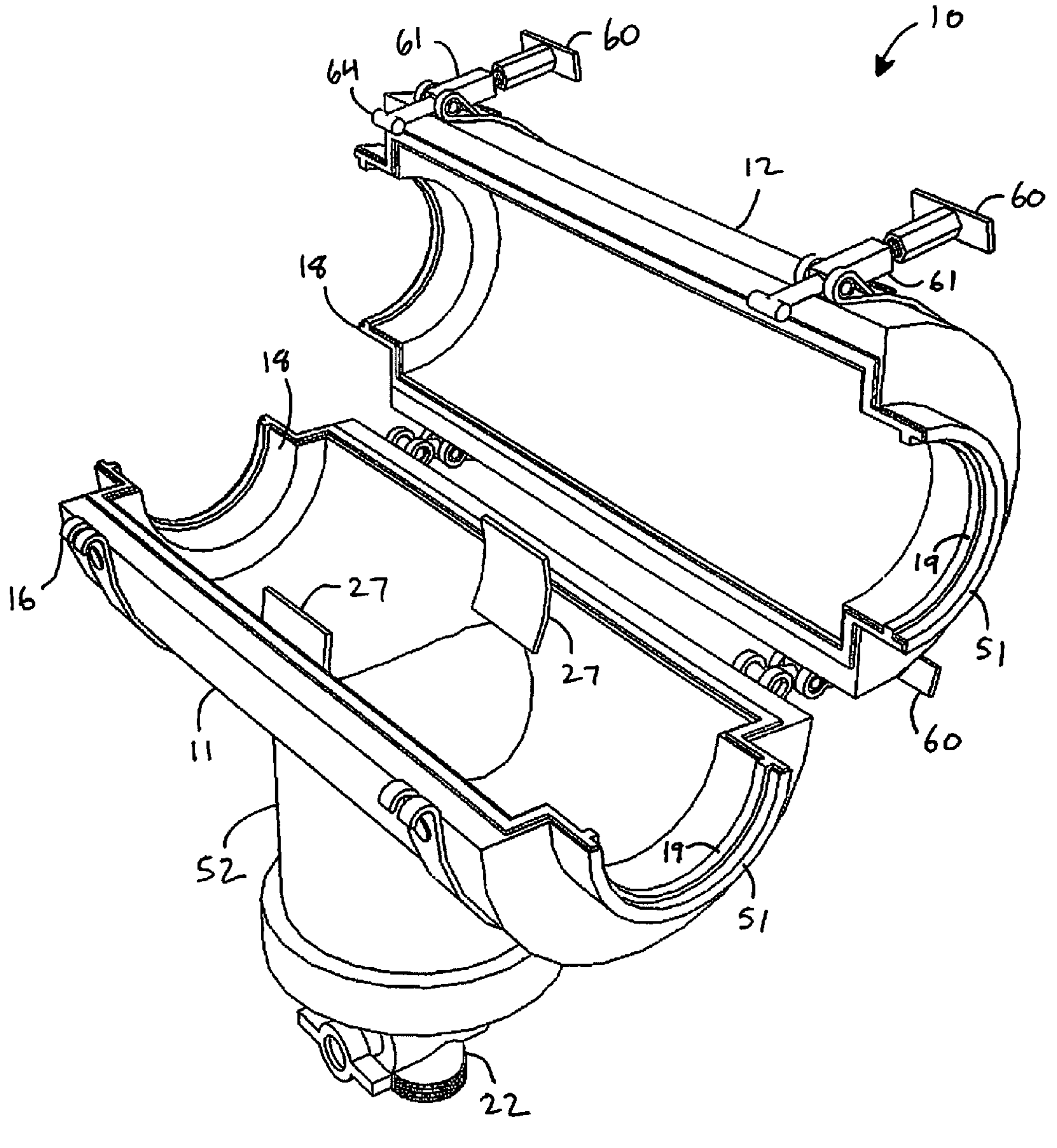
FIG. 9 is a top perspective view of a second embodiment of the invention.
Figure 10:
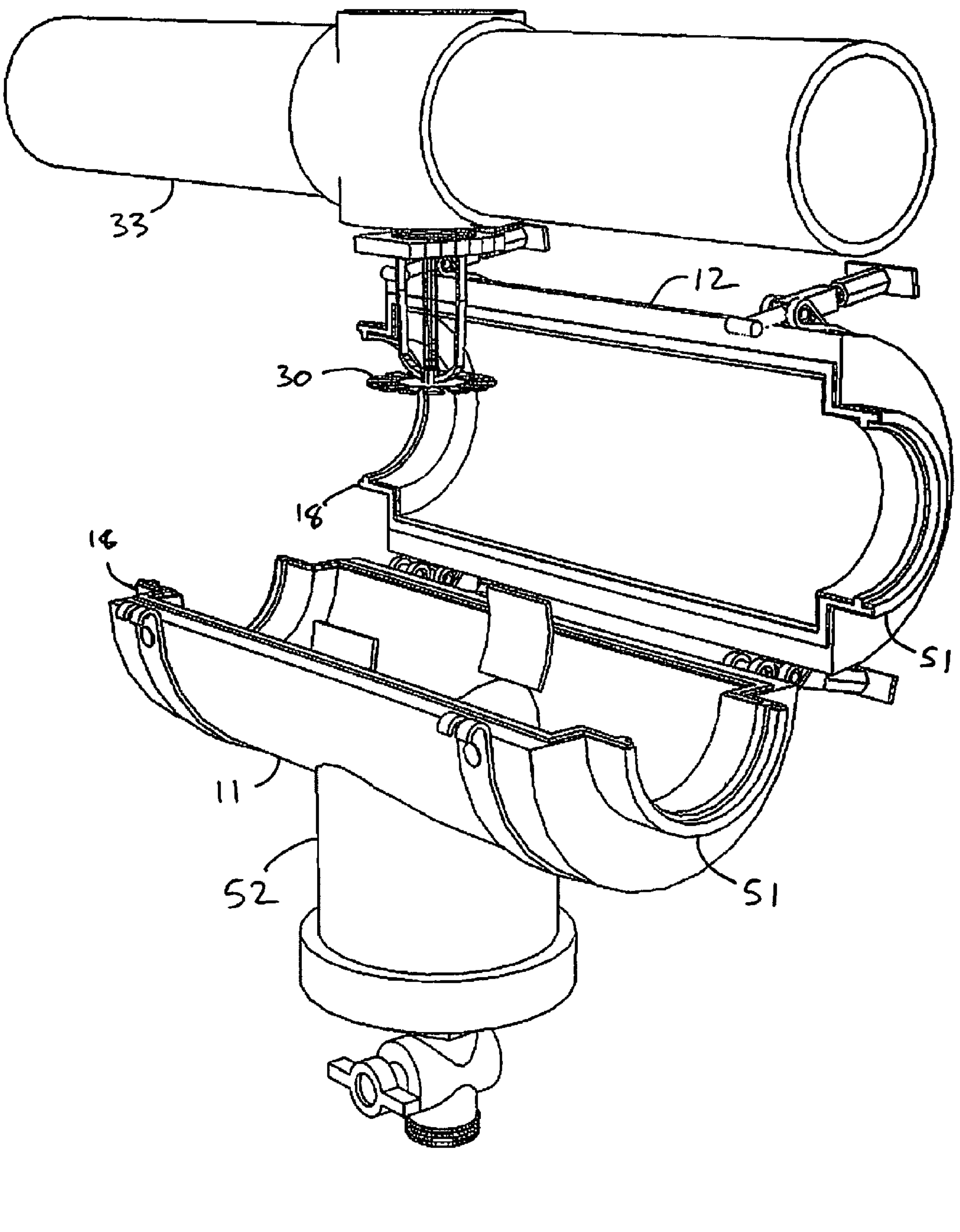
FIG. 10 is a top perspective view of the embodiment of FIG. 9 shown in relation to a direct-mount sprinkler head and supply pipe.
Figure 11:
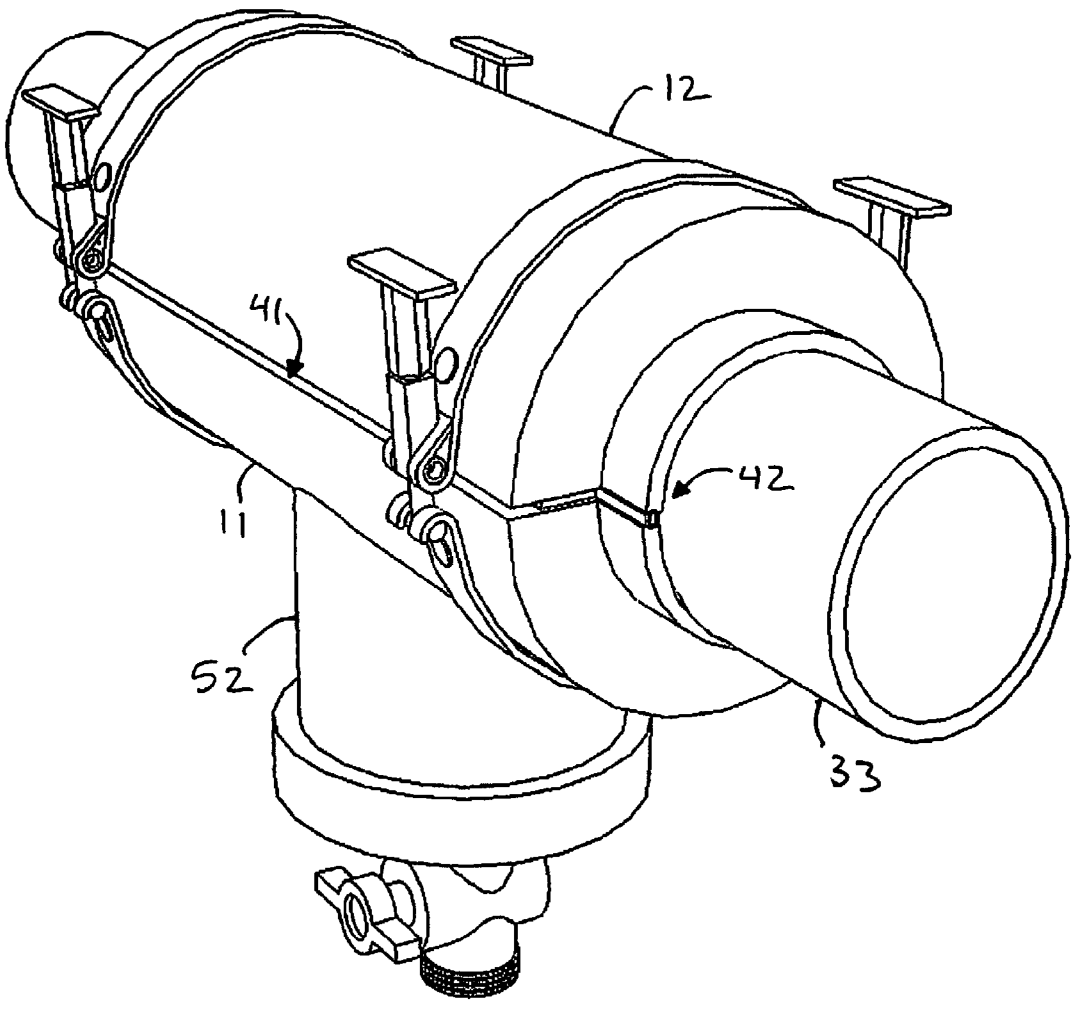
FIG. 11 is a top perspective view of the embodiment of FIG. 9 closed and latched around the direct-mount sprinkler head and supply pipe.

In the first embodiment, the intended sprinkler head 30 is a flanged sprinkler head having an extension pipe 31 that extends from the water supply pipe (not shown) and ends in a flange 32 into which the sprinkler head 30 is threadedly mated. The neck 40 fits around the extension pipe 31 and has a smaller diameter than the flange 32, so that the flange 32 abuts the interior surface of the proximal ends of the first shell 11 and second shell 12 to hold the casing 10 in place. To encase the sprinkler head 30, a user places the first shell 11 or second shell 12 around the extension pipe 31, as shown in FIG. 3, closes the casing 10 using the guides 27 to ensure the shells 11, 12 are aligned, and latches the casing 10. The hinging and latching mechanisms may be tightened down to complete the seal if needed, such as in the embodiment of FIGS. 5-8. Preferably, the valve in the nozzle 22 is open when the user closes and latches the casing 10 so that pressure does not immediately begin to build inside the casing 10 before the casing 10 can be fully latched. The open valve keeps the pressure at equilibrium, and can then be closed once the latches are secure.

FIGS. 9-12 illustrate a second embodiment of the casing 10. In the second embodiment, the intended sprinkler head 30 is directly mounted into a water supply pipe 33. The casing 10 must therefore fit around the supply pipe 33, which may be the same diameter or larger than the extension pipe 31. For a supply pipe 33 larger than an extension pipe 31, the first embodiment of the casing 10 is modified to have a wider neck 40. The casing 10 further has a second neck 42 formed by distal neck portions 51 formed into the distal ends of each of the shells 11, 12. The neck 40 and second neck 42 are aligned to allow the supply pipe 33 to pass completely through the casing 10. The gaskets 19 may include additional neck gaskets that extend into the distal neck portions 51. Preferably, the second embodiment comprises two gaskets 19, each having neck gaskets in the proximal and distal neck portions 18, 51 of the corresponding shell 11, 12.

The first shell 11 further comprises a branch 52 extending away from the main part of the first shell 11, the branch 52 being sized to receive the sprinkler head 30. See FIGS. 10 and 11. The drain 17 is disposed in the bottom of the branch 52. To encase the sprinkler head 30, a user places the first shell 11 up against the bottom of the supply pipe 33, closes the second shell 12 over the top of the supply pipe 33, and latches the casing 10. Again, preferably the valve in the nozzle 22 is open when the user closes and latches the casing 10 so that pressure does not immediately begin to build inside the casing 10 before the casing 10 can be fully latched. The guides 27 and hinging and latching mechanisms described in the first embodiment may be used for the second embodiment as well.

Figure 12:
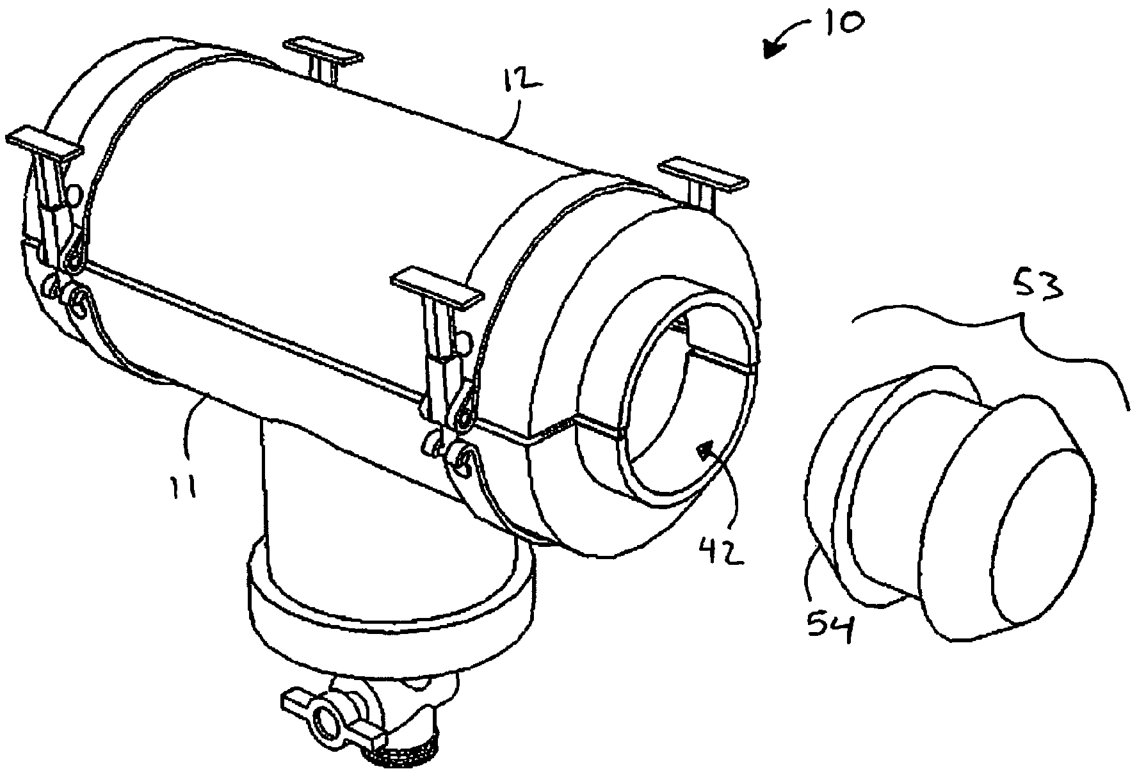
FIG. 12 is a top perspective view of the embodiment of FIG. 9 shown with a neck plug.
Figure 13:
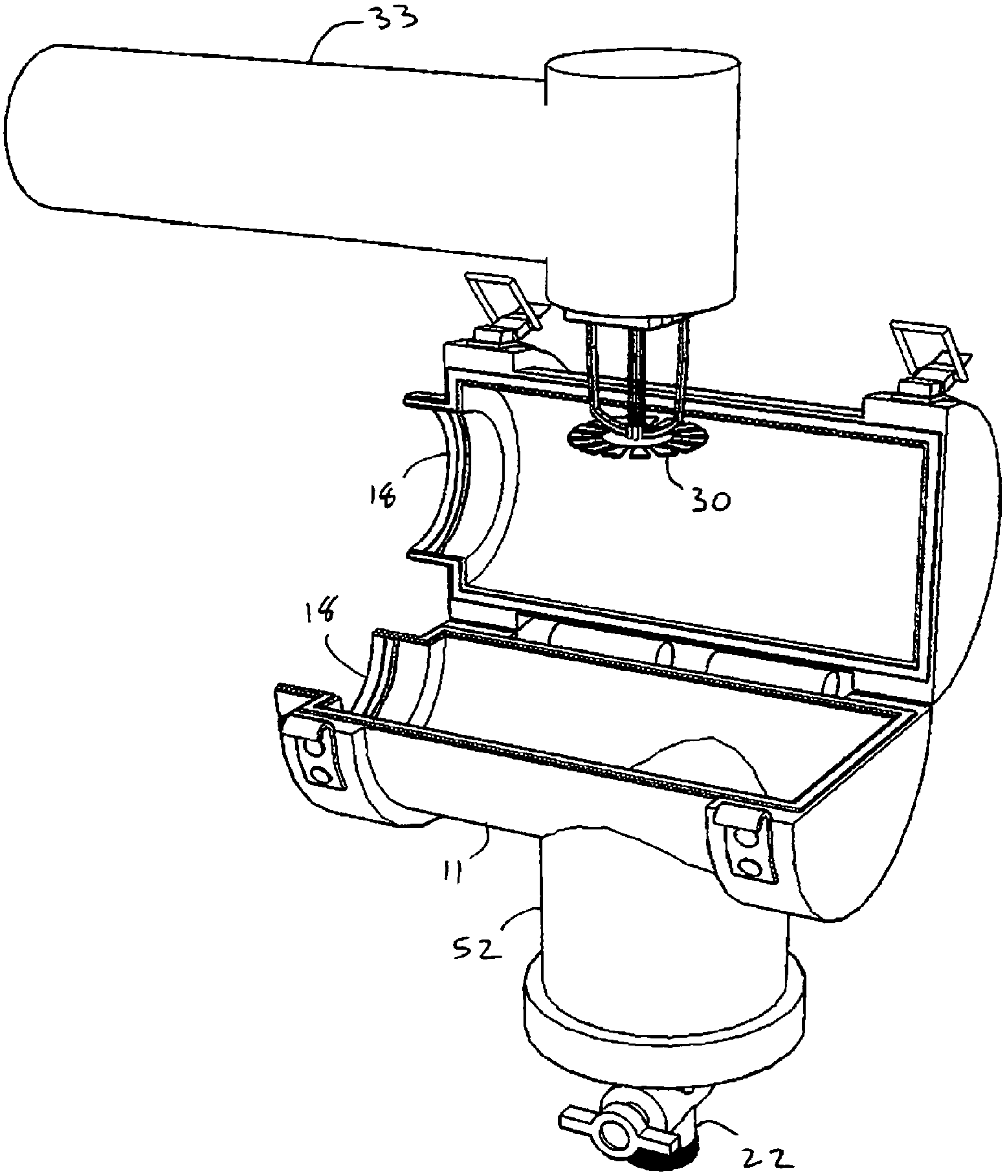
FIG. 13 is a top perspective view of a third embodiment of the invention shown in relation to a terminal sprinkler head and supply pipe.
Figure 14:
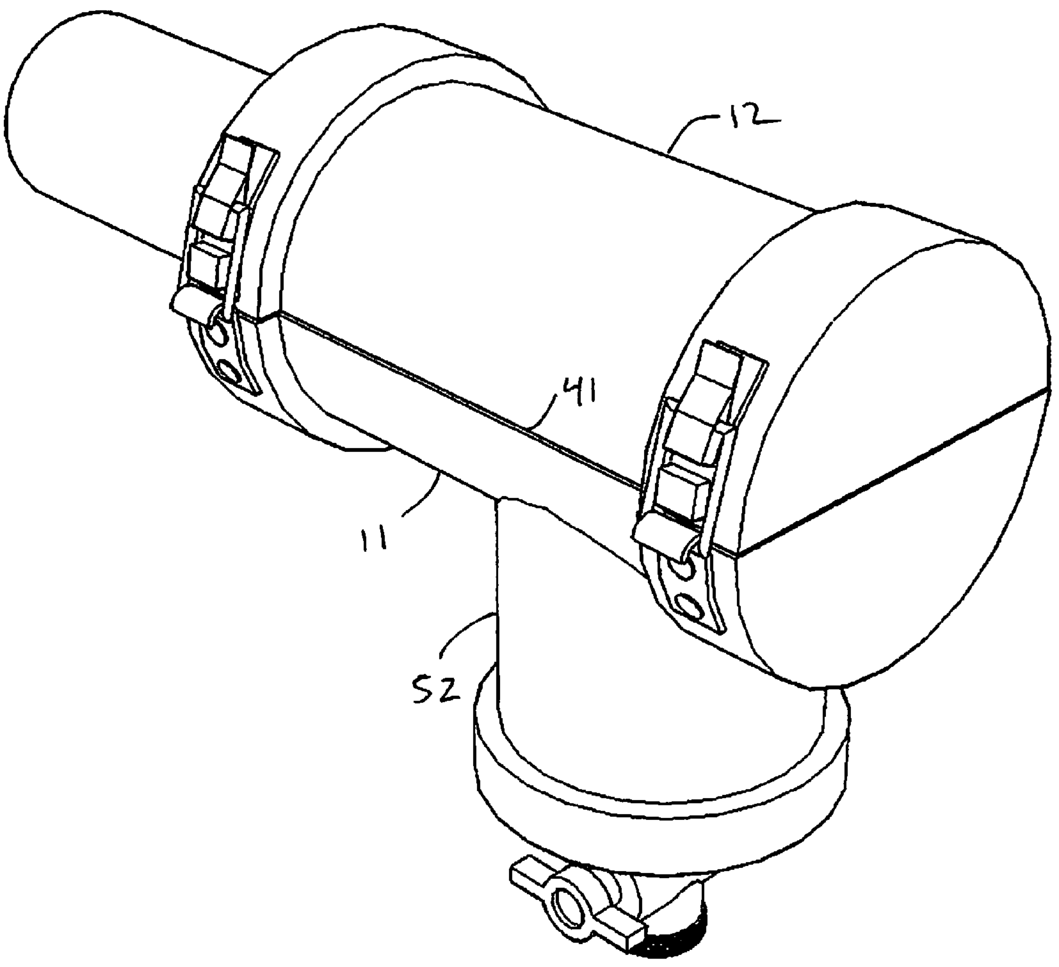
FIG. 14 is a top perspective view of the embodiment of FIG. 13 closed and latched around a terminal sprinkler head and supply pipe.

The second embodiment may also be used with a terminal sprinkler head 30 such as the sprinkler head 30 illustrated in FIG. 13. This is accomplished by sealing the opening in the second neck 42 with a plug 53, as illustrated in FIG. 12. The plug 53 has a head 54 made of a material that is substantially rigid but has some elasticity. The elasticity allows the head 54 to be inserted through the second neck 42 into the interior space, forming a watertight seal over the opening in the second neck 42. Alternatively, a third embodiment of the casing 10, shown in FIGS. 13 and 14, may be used for such terminal sprinkler heads 30. The third embodiment retains the branch 52 of the second embodiment but removes the second neck 42, so that only the neck 40 fits around the supply pipe 33. To encase the sprinkler head 30, a user places the first shell 11 up against the bottom of the supply pipe 33, closes the second shell 12 over the top of the supply pipe 33, and latches the casing 10. Again, preferably the valve in the nozzle 22 is open when the user closes and latches the casing 10 so that pressure does not immediately begin to build inside the casing 10 before the casing 10 can be fully latched. The guides 27 and hinging and latching mechanisms described in the first embodiment may be used for the third embodiment as well.

With the casing 10 in place, water flowing from the sprinkler head 30 fills the interior space until sufficient pressure builds within the casing 10 at the mouth of the sprinkler head 30 to stop the flow of water. If the air inside the casing 10 is allowed to be displaced, either through the non-airtight seal or through the nozzle 22, the interior pressure needed to stop the flow of water is reached once the interior space has completely filled with water. If the seal is airtight and the nozzle 22 is closed, the total pressure, comprising air pressure and water pressure, will stop the flow. Once head has been encased, the remainder of the fire sprinkler system may operate normally. The sprinkler head 30 may then be bypassed or the system water may be shut off at an opportune time, after which the valve in the nozzle 22 may be opened for controlled emptying of the water in the casing 10 and the casing 10 may be unlatched and removed and the malfunctioning sprinkler head may be repaired.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. An apparatus for encasing a fire sprinkler head attached to a pipe, such that the encasing stops the flow of water out of the fire sprinkler head, the apparatus comprising:

a. a first shell;

b. a second shell attached to the first shell such that the first and second shells may be closed together to encase the fire sprinkler head; and c. a first gasket attached to the first shell so that the first gasket cooperates with the second shell to form a watertight seal around the fire sprinkler head when the first and second shells are closed together;

d. a drain disposed through the first shell or second shell; and e. a valved nozzle in fluid communication with the drain.

2. The apparatus of claim 1 wherein the watertight seal is configured to withstand water pressure within a fire sprinkler system to which the fire sprinkler head belongs.

3. The apparatus of claim 1 further comprising a second gasket attached to the second shell so that the first gasket contacts the second gasket to form the watertight seal.

4. The apparatus of claim 1 wherein:

a. the first shell comprises a first neck portion having a neck gasket;

b. the second shell comprises a first neck portion having a neck gasket; and c. the neck gaskets of the first and second shells cooperate to form a watertight seal around the pipe.

5. The apparatus of claim 1 further comprising one or more hinges attached to the first and second shells such that the first and second shells close together in a clamshell fashion.

6. The apparatus of claim 1 further comprising one or more latches configured to secure the first and second shells in a closed position in which the watertight seal is formed.

7. The apparatus of claim 6 wherein the latches are adjustable and may be tightened to compress the first gasket to form the watertight seal.

8. An apparatus for encasing a fire sprinkler head attached to a pipe, such that the encasing stops the flow of water out of the fire sprinkler head, the apparatus comprising:

a. a first shell comprising a first neck portion at an end of the first shell;

b. a second shell comprising a first neck portion at an end of the second shell, the second shell being configured to close against the first shell to define an interior space large enough to encase the fire sprinkler head, the first neck portions of each shell cooperating to form a first neck around the pipe when the first and second shells are closed together;

c. one or more hinges attached to the first and second shells such that the first and second shells close together in a clamshell fashion;

d. a first gasket disposed on the first shell;

e. a second gasket disposed on the second shell such that the second gasket contacts the first gasket when the first and second shells are closed together;

f. a first neck gasket disposed within the first neck portion of the first shell such that the first neck gasket contacts the pipe when the first and second shells are closed together;

g. a second neck gasket disposed within the first neck portion of the second shell such that the second neck gasket contacts the pipe when the first and second shells are closed together; and h. one or more latches configured to secure the first and second shells in a closed position in which the first gasket, second gasket, first neck gasket, and second neck gasket cooperate to form a substantially watertight seal around the fire sprinkler head and pipe when the first and second shells are closed together and the latches are engaged;

i. a drain disposed through the first shell;

j. a valved nozzle attached to the first shell in fluid communication with the drain; and k. a lever attached to the nozzle for opening and closing the nozzle.

9. The apparatus of claim 8 wherein each hinge comprises:

a. a front hinge portion attached to the first shell;

b. a rear hinge portion attached to the second shell; and c. a hinging mechanism comprising:

i. an anchor attached to the rear hinge portion, the anchor having a channel passing from its proximal end to its distal end;

ii. a bolt having a threaded portion at its distal end and a head at its proximal end, the head being attached to the front hinge portion, and the bolt passing through the channel of the anchor; and iii. a wingnut configured to threadedly mate with the bolt at the distal end of the bolt.

10. The apparatus of claim 9 further comprising one or more guides disposed on an inner surface of the first shell and configured to align the first and second shells when closing the first and second shells together.

11. The apparatus of claim 8 wherein the first shell further comprises a branch being sized to receive the sprinkler head.

12. The apparatus of claim 11 wherein:

a. the first shell further comprises a second neck portion at an end of the first shell opposite the end comprising the first neck portion;

b. the second shell further comprises a second neck portion at an end of the second shell opposite the end comprising the first neck portion, the second neck portions of each shell cooperating to form a second neck around the pipe when the first and second shells are closed together; and c. the apparatus further comprises:

i. a third neck gasket disposed within the second neck portion of the first shell such that the third neck gasket contacts the pipe when the first and second shells are closed together; and ii. a fourth neck gasket disposed within the second neck portion of the second shell such that the fourth neck gasket contacts the pipe when the first and second shells are closed together, the third and fourth neck gaskets cooperating with the first gasket, second gasket, first neck gasket, and second neck gasket to form the seal.

13. An apparatus for encasing a fire sprinkler head attached to a pipe, such that the encasing stops the flow of water out of the fire sprinkler head, the apparatus comprising:

a. a first shell comprising a first neck portion at the proximal end of the first shell;

b. a second shell comprising a first neck portion at the proximal end of the second shell, the second shell being configured to close against the first shell to define an interior space large enough to encase the fire sprinkler head, the first neck portions of each shell cooperating to form a first neck around the pipe when the first and second shells are closed together;

c. a plurality of hinges configured to removably attach the first shell to the second shell so that the shells close together in a clamshell fashion, each hinge comprising:

i. a front hinge portion attached to the first shell;

ii. a rear hinge portion attached to the second shell; and iii. a hinging mechanism comprising:

1. an anchor attached to the rear hinge portion, the anchor having a channel passing from its proximal end to its distal end;

2. a bolt having a threaded portion at its distal end and a head at its proximal end, the head being attached to the front hinge portion, and the bolt passing through the channel of the anchor; and 3. a wingnut configured to threadedly mate with the bolt at the distal end of the bolt;

d. a first gasket disposed on the first shell;

e. a second gasket disposed on the second shell such that the second gasket contacts the first gasket when the first and second shells are closed together;

f. a first neck gasket disposed within the first neck portion of the first shell such that the first neck gasket contacts the pipe when the first and second shells are closed together;

g. a second neck gasket disposed within the first neck portion of the second shell such that the second neck gasket contacts the pipe when the first and second shells are closed together;

h. a plurality of latches configured to secure the first and second shells in a closed position when the first and second shells are closed together and the latches are engaged, each latch comprising:

i. a hook attached to the first shell, the hook comprising a channel;

ii. a bracket attached to the second shell; and iii. a latching mechanism comprising:

1. an anchor attached to the bracket, the anchor having a channel passing from its proximal end to its distal end;

2. a bolt having a threaded portion at its distal end and a head at its proximal end, the head being configured to fit into the hook, and the bolt passing through the channel of the anchor and fitting into the channel of the hook when the first and second shells are in the closed position; and 3. a wingnut configured to threadedly mate with the bolt at the distal end of the bolt;

i. a drain disposed through the first shell;

j. a valved nozzle attached to the first shell in fluid communication with the drain;

k. a lever attached to the nozzle for opening and closing the nozzle; and l. one or more guides disposed on an inner surface of the first shell and configured to align the first and second shells when closing the first and second shells together;

the first and second shells being drawn tightly together when in the closed position by tightening one or more of the wingnuts of the hinges and wingnuts of the latches, such that the first gasket, second gasket, first neck gasket, and second neck gasket cooperate to form a substantially watertight seal around the fire sprinkler head and pipe.

14. The apparatus of claim 13 wherein the first shell further comprises a branch being sized to receive the sprinkler head.

15. The apparatus of claim 14 wherein:

a. the first shell further comprises a second neck portion at the distal end of the first shell;

b. the second shell further comprises a second neck portion at the distal end of the second shell, the second neck portions of each shell cooperating to form a second neck around the pipe when the first and second shells are closed together; and c. the apparatus further comprises:

i. a third neck gasket disposed within the second neck portion of the first shell such that the third neck gasket contacts the pipe when the first and second shells are closed together; and ii. a fourth neck gasket disposed within the second neck portion of the second shell such that the fourth neck gasket contacts the pipe when the first and second shells are closed together, the third and fourth neck gaskets cooperating with the first gasket, second gasket, first neck gasket, and second neck gasket to form the seal.

16. The apparatus of claim 15 further comprising a plug removably inserted within the second neck to seal the second neck.

* * * * *